US011514343B2

(12) United States Patent
Armstrong-Crews et al.

(10) Patent No.: US 11,514,343 B2
(45) Date of Patent: Nov. 29, 2022

(54) SIMULATING DEGRADED SENSOR DATA

(71) Applicant: Waymo LLC, Mountain View, CA (US)

(72) Inventors: Nicholas Armstrong-Crews, Mountain View, CA (US); Arthur Safira, Los Altos, CA (US); Alex Mccauley, Sunnyvale, CA (US); Ruffin Evans, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 252 days.

(21) Appl. No.: 16/916,384

(22) Filed: Jun. 30, 2020

(65) Prior Publication Data

US 2021/0406722 A1 Dec. 30, 2021

(51) Int. Cl.
*G06N 5/04* (2006.01)
*B60W 50/00* (2006.01)
*G06N 20/00* (2019.01)
*G01S 7/48* (2006.01)
*G01S 7/02* (2006.01)

(52) U.S. Cl.
CPC ............ *G06N 5/04* (2013.01); *B60W 50/0098* (2013.01); *G06N 20/00* (2019.01); *B60W 2050/0037* (2013.01); *B60W 2050/0052* (2013.01); *B60W 2050/0083* (2013.01); *B60W 2420/42* (2013.01); *B60W 2420/52* (2013.01); *B60W 2555/20* (2020.02); *G01S 7/02* (2013.01); *G01S 7/4808* (2013.01)

(58) Field of Classification Search
CPC ..... G06N 5/04; G06N 20/00; B60W 50/0098; B60W 2050/0037; B60W 2050/0052; B60W 2050/0083; B60W 2420/42; B60W 2420/52; B60W 2555/20; G01S 7/02; G01S 7/4808; G01S 7/4039; G01S 17/931; G01S 13/931; G01S 13/865
See application file for complete search history.

(56) References Cited

U.S. PATENT DOCUMENTS

| 10,489,972 | B2 | 11/2019 | Atsmon | |
| 10,496,766 | B2 | 12/2019 | Levinson et al. | |
| 10,981,272 | B1 * | 4/2021 | Nagarajan | ............... B25J 9/1669 |
| 2021/0073584 | A1 * | 3/2021 | St. Romain, II | ...... G06T 19/003 |

FOREIGN PATENT DOCUMENTS

EP 3618013 A1 * 3/2020 ........... G07C 5/0841

OTHER PUBLICATIONS

Andreas Pfeuffer, et al., Robust Semantic Segmentation in Adverse Weather Conditions by means of Sensor Data Fusion, May 24, 2019, arXiv:1905.10117v1 [cs.CV], IEEE, pp. 1-8.
Sorin Grigorescu, et al., A Survey of Deep Learning Techniques for Autonomous Driving, Elektrobit Automotive, Oct. 17, 2019, arXiv:1910.07738v1 [cs.LG], pp. 1-38.

* cited by examiner

*Primary Examiner* — Marthe Y Marc-Coleman
(74) *Attorney, Agent, or Firm* — Botos Churchill IP Law

(57) ABSTRACT

Simulated degraded sensor data may be generated for use in training a model. For instance, first sensor data collected by a sensor of a perception system of an autonomous vehicle may be received and converted into the simulated degraded sensor data for a particular degrading condition, such as a weather-related degrading condition. Then, the simulated degraded sensor data may be used to train a model for evaluating performance of the perception system to detect objects external to the autonomous vehicle under one or more conditions.

21 Claims, 11 Drawing Sheets

SIMULATING DEGRADED SENSOR DATA

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Autonomous vehicles are equipped with various types of sensors in order to detect objects in the surroundings. For example, autonomous vehicles may include sonar, radar, camera, LIDAR, and other devices that scan and record data from the vehicle's surroundings.

SUMMARY

Figure 1:
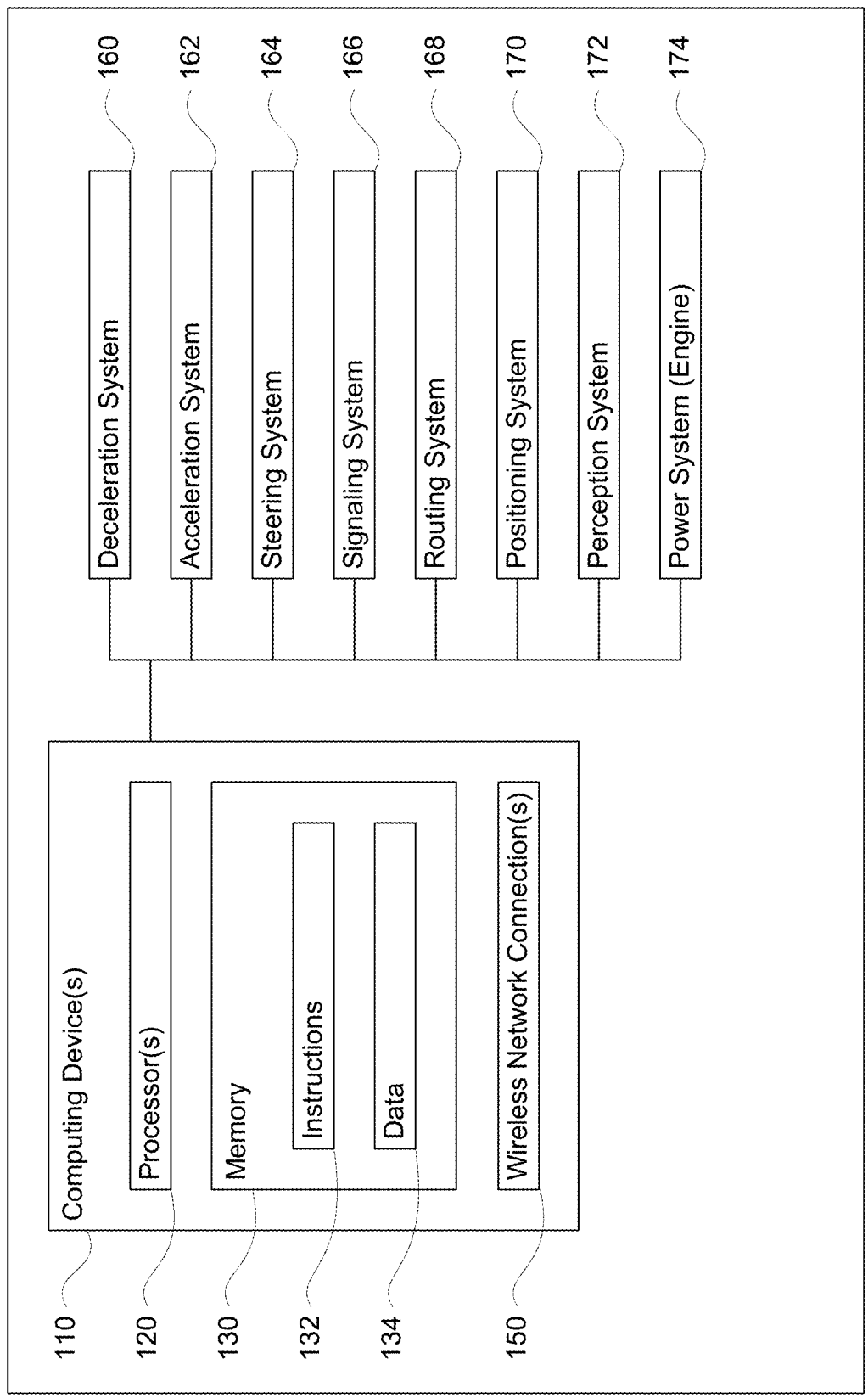
FIG. 1 is a functional diagram of an example vehicle in accordance with an exemplary embodiment.

Aspects of the disclosure provide a method for generating simulated degraded sensor data. The method includes receiving, by one or more processors, first sensor data collected by a sensor of a perception system of an autonomous vehicle; converting, by the one or more processors, the first sensor data into simulated degraded sensor data for a particular degrading condition; and using, by the one or more processors, the simulated degraded sensor data to evaluate or train a model for detecting objects of the perception system.

In one example, converting the first sensor data includes using a physics-based forward model to approximate attenuation caused by the particular degrading condition. In this example, the method also includes determining an expected maximum perception range for the sensor based on the approximated attenuation, and wherein converting the sensor data into simulated sensor data for the particular degrading condition is further based on the expected maximum perception range. In another example, the particular degrading condition is fog, and the simulated degraded sensor data simulates a backscatter effect of fog redirecting light back to the sensor. In another example, the particular degrading condition is humidity, and the simulated degraded sensor data simulates attenuation effects at different wavelengths of light. In another example, the particular degrading condition is rain, and the simulated degraded sensor data simulates attenuation effects of rain of a particular severity. In another example, the particular degrading condition is drops of water on an aperture of the sensor, and the simulated degraded sensor data simulates attenuation effects of the drops of water. In another example, the method also includes determining an expected maximum perception range for the sensor based on the approximated attenuation. In another example, converting the first sensor data includes filtering the first sensor data to remove one or more of LIDAR sensor data points or radar sensor data points beyond an expected range of perception for the particular degrading condition. In another example, converting the first sensor data includes blurring and reducing contrast in images of the sensor data to a different degree depending on a range of each pixel for the particular degrading condition. In another example, converting the first sensor data includes filtering the sensor data to remove one or more of LIDAR sensor data points or radar sensor data points corresponding to objects having intensity values below a predetermined threshold for the particular degrading condition. In another example, converting the first sensor data includes darkening all or portions of a camera image based on the particular degrading condition. In another example, converting the first sensor data includes darkening one or more intensity values of one or more of LIDAR sensor data points or radar sensor data points based on the particular degrading condition. In another example, converting the first sensor data includes using a machine learned model trained to produce the simulated degraded sensor data when the first sensor data is input into the machine learned model. In this example, the machine learned model trained to apply textures and low-level image operators that degrade image quality in the particular degrading condition. In addition or alternatively inputting a degrading severity vector into the machine learned model in order to convert the first sensor data. In addition or alternatively, the method also includes training the machine learned model using an unsupervised learning approach where degraded sensor data is used rather than a combination of nominal sensor data and degraded sensor data. In this example, the method also includes inputting a degrading severity vector into the machine learned model in order to convert the first sensor data. In this example, the method also includes training the model using pairs of sensor data for a same scene in different weather conditions. In another example, evaluating the model includes inputting the simulated degraded sensor data into the model to identify one or more labels for objects and comparing the identified one or more labels for objects with one or more labels associated with the first sensor data. In another example, training the model includes using the simulated degraded sensor data and one or more labels for objects associated with the first sensor data as training data for the model in order to improve performance of the model for the particular degrading condition.

DETAILED DESCRIPTION

Overview

The technology relates to generating sensor data that is degraded due to, for example, effects of weather, debris, etc.

for machine learning and other purposes. To evaluate and also to improve the performance of a vehicle's perception system in conditions that are less than ideal such as bad weather (rain, fog, snow), other atmospheric and/or lighting conditions (different sun angles, smoke, etc.), accumulated debris on the sensor/aperture/housing (mud, water droplets, grime, etc.), imperfect or degraded sensor design or construction, it may be critical to have a sufficient amount of degraded sensor data collected from such conditions.

However, such sensor data can be difficult to collect for a number of reasons, including that typically, such vehicles are driven in only good weather conditions for safety reasons, certain weather conditions may be rare in some locations, and it may be extremely costly or impossible to collect every variation of scene under every variation of weather. For other sensor degradations, for example those due to sensor reliability failures or other design issues, likewise these vehicles will typically not operate with degraded sensors. In addition, for the purposes of training and evaluating, the degraded sensor data may need to be labeled with ground-truth objects, but at the same time, it can be difficult and costly to label by machine processes or human labelers. For example, human labelers use the collected sensor data as a reference, but in bad weather conditions, for example in heavy rain, even human operators may not be able to recognize objects in the weather-degraded sensor data. In addition, current approaches for testing sensors under weather conditions, such as using modulation transfer function (MIT) (i.e. sharpness) targets in various weather conditions, may not accurately reflect degradation of how other types of objects, such as pedestrians, etc., appear to a vehicle's perception system.

To address this lack of degraded sensor data, various approaches may be used to generate simulated degraded sensor data from sensor data captured in other conditions. For instance, as vehicles drive around, their perception systems may capture sensor data using LIDAR sensors, camera sensors, radar units, and so on. This sensor data may also be labeled. The labeled sensor data may then be processed to generate simulated degraded sensor data to which the existing labels still apply. In one approach, one or more physics-based forward models can be used for different desired weather conditions and/or different sensors. The range-dependent attenuation and backscattering of LIDAR, radar, and camera sensors can be used to predict reduced intensity, spurious (indirect-path), or missing laser returns as well as loss of image contrast, blooming, stray light due to refraction by droplets on the aperture, lens design issues, optical issues such as camera/lidar lens focal plane shift, etc.

In this regard, the labeled sensor data from good weather and/or properly operating sensors may be considered the ground truth for a scene which identifies the range and reflectivity for LIDAR, color for camera, and radar cross section for radar from the perspective of the vehicle when the sensor data was captured. Given this labeled sensor data, new degraded sensor data can be simulated using the physics-based forward model(s) and setting variables of the model(s) to the desired conditions to be simulated such as rain or snow at various millimeters per hour, fog at various visibilities, focal plane shift at various positions, etc.

The result of the aforementioned application of the model(s) may be simulated degraded sensor data. As noted above, the simulated degraded sensor data may then be used to evaluate and improve the performance of the perception system. For instance, the simulated degraded sensor data (without labels) may be input into the various models of the perception system, and the resulting perceived objects can be compared to the labels from the original sensor data. In addition, the simulated degraded sensor data and labels from the original sensor data may also be used to further train the models and improve perception of objects in various weather conditions.

The features described herein may provide for a cost effective and efficient way to provide degraded sensor data in any number of different conditions. In addition, by simulating the data, this may save not only time, but also wear and tear on vehicles as well as prevent human operators from being put into dangerous situations unnecessarily. Moreover, by simulating degraded sensor data, the performance of the perception system in different conditions can be evaluated, but also improved by using the simulated degraded sensor data to train the models of the perception system.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC, FPGA, or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

The computing devices 110 may also be connected to one or more speakers 112 as well as one or more user inputs 114. The speakers may enable the computing devices to provide audible messages and information, such as the alerts described herein, to occupants of the vehicle, including a driver. In some instances, the computing devices may be connected to one or more vibration devices configured to vibrate based on a signal from the computing devices in order to provide haptic feedback to the driver and/or any other occupants of the vehicle. As an example, a vibration device may consist of a vibration motor or one or more linear resonant actuators placed either below or behind one or more occupants of the vehicle, such as embedded into one or more seats of the vehicle.

The user input may include a button, touchscreen, or other devices that may enable an occupant of the vehicle, such as a driver, to provide input to the computing devices 110 as described herein. As an example, the button or an option on the touchscreen may be specifically designed to cause a transition from the autonomous driving mode to the manual driving mode or the semi-autonomous driving mode.

In one aspect the computing devices 110 may be part of an autonomous control system capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, routing system 166, planning system 168, positioning system 170, and perception system 172 in order to control the movement, speed, etc. of vehicle 100 in accordance with the instructions 132 of memory 130 in the autonomous driving mode. In this regard, each of these systems may include one or more processors, memory, data and instructions. Such processors, memories, instructions and data may be configured similarly to one or more processors 120, memory 130, instructions 132, and data 134 of computing device 110.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle.

Planning system 168 may be used by computing devices 110 in order to determine and follow a route generated by a routing system 166 to a location. For instance, the routing system 166 may use map information to determine a route from a current location of the vehicle to a drop off location. The planning system 168 may periodically generate trajectories, or short-term plans for controlling the vehicle for some period of time into the future, in order to follow the route (a current route of the vehicle) to the destination. In this regard, the planning system 168, routing system 166, and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In addition, the map information may identify area types such as constructions zones, school zones, residential areas, parking lots, etc.

The map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features. While the map information may be an image-based map, the map information need not be entirely image based (for example, raster). For example, the map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map and/or on the earth. The positioning system 170 may also include a GPS receiver to determine the device's latitude, longitude and/or altitude position relative to the Earth. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 170 may also include other devices in communication with the computing devices of the computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 2:
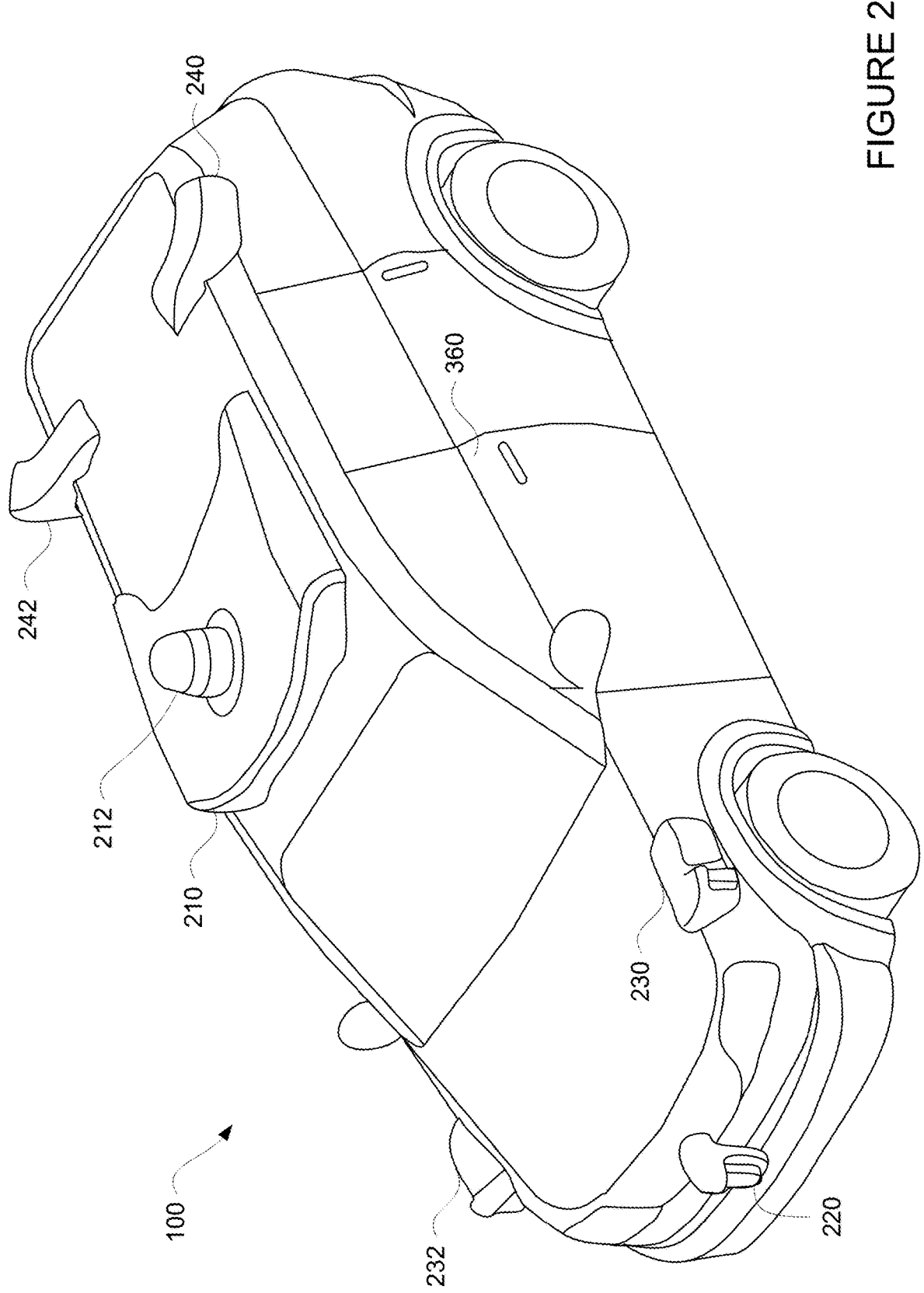
FIG. 2 is an example diagram of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location. For instance, FIG. 2 is an example external view of vehicle 100. In this example, roof-top housing 210 and dome housing 212 may include a LIDAR sensor as well as various cameras and radar units. In addition, housing 220 located at the front end of vehicle 100 and housings 230, 232 on the driver's and passenger's sides of the vehicle may each store a LIDAR sensor. For example, housing 230 is located in front of driver door 260. Vehicle 100 also includes housings 240, 242 for radar units and/or cameras also located on the roof of vehicle 100. Additional radar units and cameras (not shown) may be located at the front and rear ends of vehicle 100 and/or on other positions along the roof or roof-top housing 210.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, routing system 166, planning system 168, positioning system 170, perception system 172, and power system 174 (i.e. the vehicle's engine or motor) in order to control the movement, speed, etc. of vehicle 100 in accordance with the instructions 132 of memory 130.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar sensors, sonar units, etc., to detect and identify objects and their features. These features may include location, type, heading, orientation, speed, acceleration, change in acceleration, size, shape, etc. In some instances, features may be input into a behavior prediction system software module which uses various behavior models based on object type to output a predicted future behavior for a detected object.

In other instances, the features may be put into one or more detection system software modules, such as a traffic light detection system software module configured to detect the states of known traffic signals, a school bus detection system software module configured to detect school busses, construction zone detection system software module configured to detect construction zones, a detection system software module configured to detect one or more persons (e.g. pedestrians) directing traffic, a traffic accident detection system software module configured to detect a traffic accident, an emergency vehicle detection system configured to detect emergency vehicles, etc. Each of these detection system software modules may input sensor data generated by the perception system 172 and/or one or more sensors (and in some instances, map information for an area around the vehicle) into various models which may output a likelihood of a certain traffic light state, a likelihood of an object being a school bus, an area of a construction zone, a likelihood of an object being a person directing traffic, an area of a traffic accident, a likelihood of an object being an emergency vehicle, etc., respectively.

Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planning system software module of the planning system 168. The planning system may use this input to generate trajectories for the vehicle to follow for some brief period of time into the future based on a current route of the vehicle generated by a routing module of the routing system 166. A control system software module of the computing devices 110 may be configured to control movement of the vehicle, for instance by controlling braking, acceleration and steering of the vehicle, in order to follow a trajectory.

Computing devices 110 may also include one or more wireless network connections 150 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 172 to detect and respond to objects when needed to reach the location safely. Again, in order to do so, computing device 110 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g. by using turn signals). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 3:
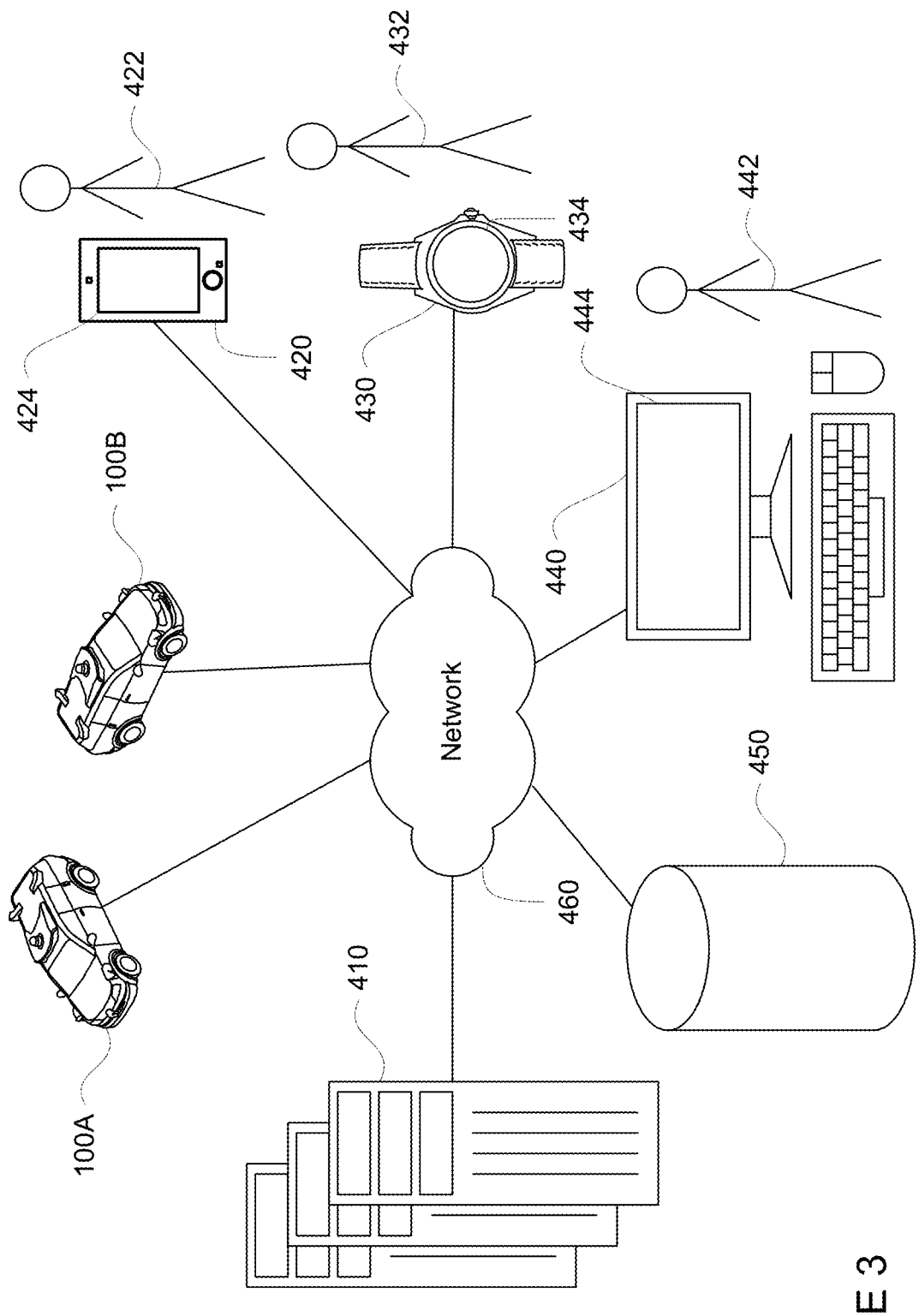
FIG. 3 is an example pictorial diagram of a system in accordance with aspects of the disclosure.
Figure 4:
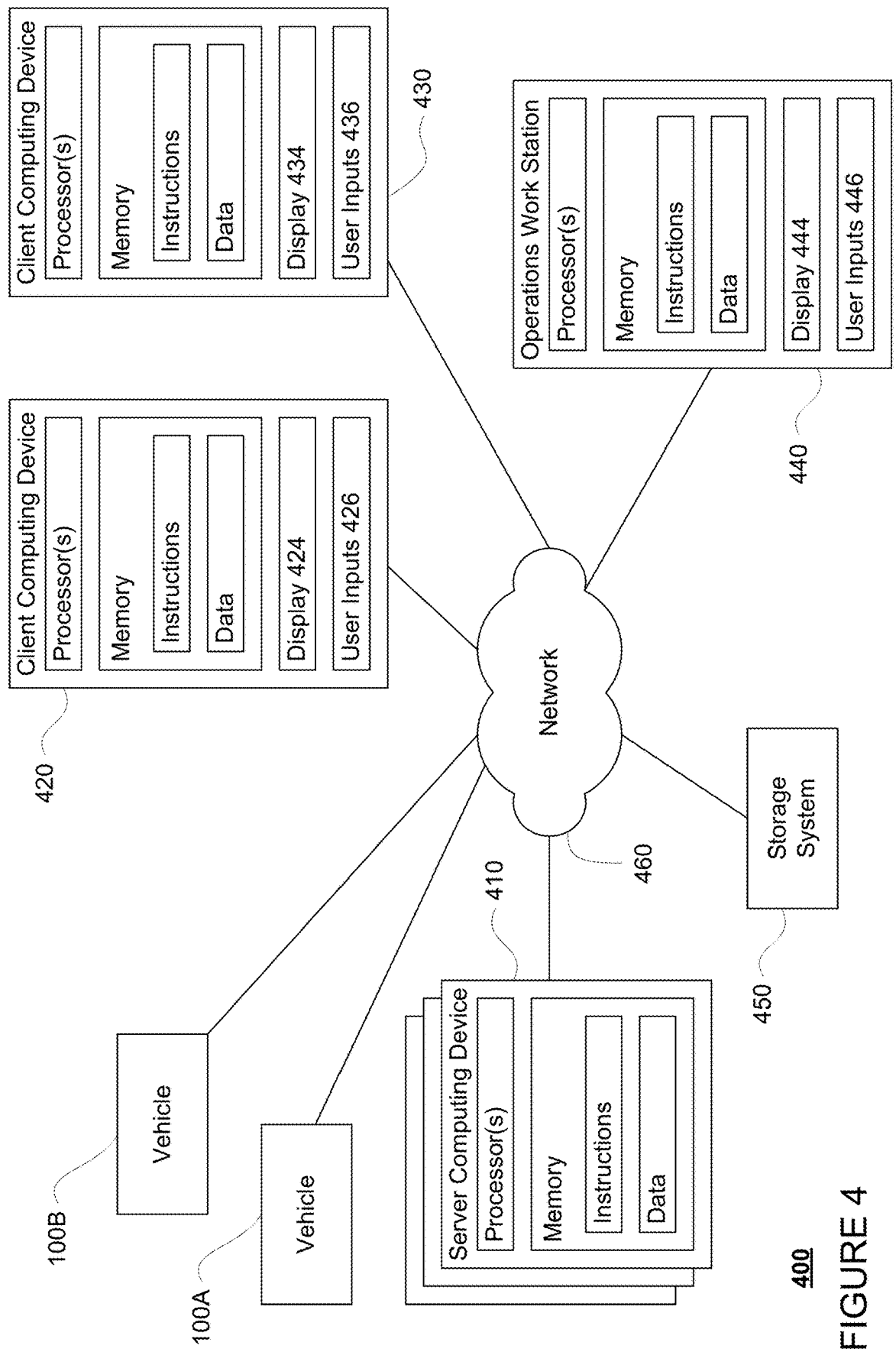
FIG. 4 is an example functional diagram of a system in accordance with aspects of the disclosure.

Computing device 110 of vehicle 100 may also receive or transfer information to and from other computing devices, such as those computing devices that are a part of the transportation service as well as other computing devices. FIGS. 3 and 4 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, instructions and data. Such processors, memories, data and instructions may be configured similarly to one or more processors 120, memory 130, instructions 132 and data 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a validation computing system which can be used to validate autonomous control software which vehicles such as vehicle 100 and vehicle 100A may use to operate in an autonomous driving mode. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 440 may be an operations workstation used by an administrator or operator to review scenario outcomes, handover times, and validation information as discussed further below. Although only a single operations workstation 440 is shown in FIGS. 4 and 5, any number of such work stations may be included in a typical system. Moreover, although operations workstation is depicted as a desktop computer, operations work stations may include various types of personal computing devices such as laptops, netbooks, tablet computers, etc.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information stored in the storage system 450 may be retrieved or otherwise accessed by a server computing device, such as one or more server computing devices 410, in order to perform some or all of the features described herein.

The storage information may store sensor data collected by sensors of a perception system of an autonomous vehicle, such as the perception system 172 of vehicle 100. This sensor data may be "nominal" sensor data that has been captured in good or fair weather, nominal lighting, clean apertures, etc., conditions. For instance, as vehicles such as vehicle 100 drives around, their perception systems, such as perception system 172, may capture sensor data using LIDAR sensors, camera sensors, radar units, and so on. At least some of this sensor data may also be labeled by the perception system to identify various objects and their characteristics. Alternatively, the sensor data may be labeled by human labelers.

The storage system may also store one or more models. The models may include one or more physics-based forward models (e.g. those that predict the probability of attenuation or backscatter) for different conditions (and, in some instances, for different severities) and/or different sensors as discussed further below. The storage system 450 may also store simulated sensor data as discussed further below.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 10:
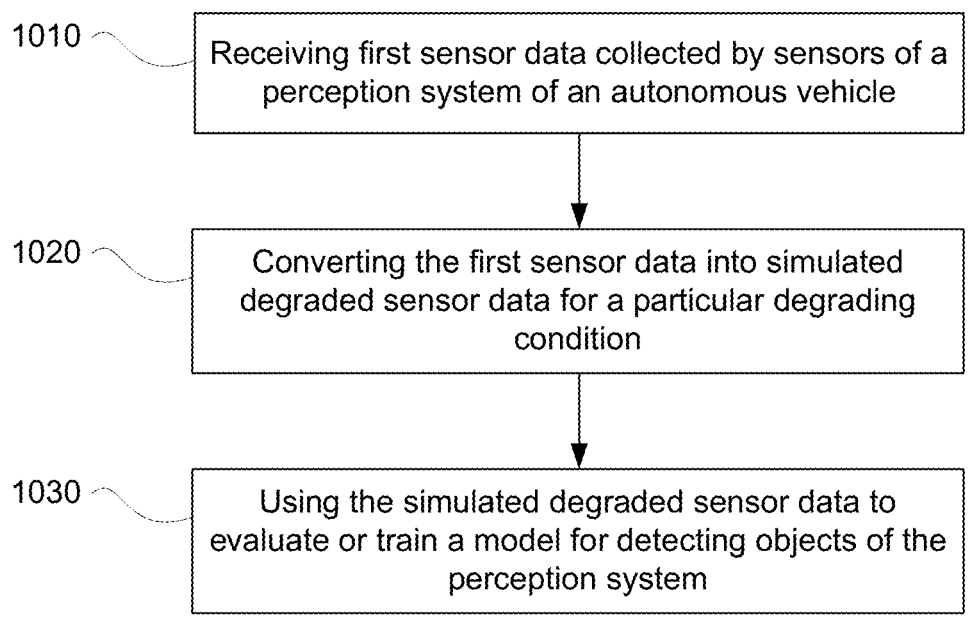
FIG. 10 is an example flow diagram in accordance with aspects of the disclosure.

FIG. 10 includes an example flow diagram 1000 of some of the examples for generating simulated degraded sensor data, which may be performed by one or more processors such as processors 420 of server computing devices 210. For instance, at block 1010, first sensor data collected by a sensor of a perception system of an autonomous vehicle is received. This sensor data may include the labeled sensor data retrieved from the storage system 450.

At block 1020, the first sensor data is converted into simulated degraded sensor data for a particular degrading condition. The labeled sensor data may then be processed to generate simulated degraded sensor data to which the existing labels still apply. In one approach, one or more physics-based forward models (e.g. those that predict the probability of attenuation or backscatter) or other models (e.g. machine learned models discussed below) can be used for different desired conditions (for example, different weather conditions which, in some instances, may have different severities) and/or different sensors.

In this regard, different models may be used for different sensors and different conditions. Alternatively, a single model that can handle multiple conditions, such as both rain and fog or actively raining/snowing as well as wet or snowy roads after rain/snow events for example, may be used, though different models may still be used to handle different types of sensor data (e.g. LIDAR sensor data and camera data). In still other examples, a single model may be used for different types of sensor data. Such a model would be much more powerful, since for example, it may be difficult to predict fog attenuation in a camera image without depth information, which can be determined from LIDAR sensor data. The aforementioned models may all also be applied to non-weather degradations, for example to camera or lidar focal plane shift, where objects at different distances may appear defocused by different amounts depending on distance.

The range-dependent attenuation and backscattering of LIDAR, radar, and camera sensors can be used by the server computing devices 410 to predict reduced intensity, spurious (indirect-path) returns, or missing laser returns as well as loss of image contrast, blooming, stray light to refraction by droplets on the aperture, lens design issues, optical issues such as camera/lidar lens focal plane shift, etc. Attenuation may refer to the reduction in amplitude of a signal returned to a sensor. For instance, the attenuation spectrum of a specific LIDAR or radar can be measured in various conditions such as humidity (using Beer-Lambert Law, Allard's Law or others), fog, smoke, haze, air pollution or smog, and rain in a lab or real-world setting (see plots below for humidity examples).

Figure 5A:
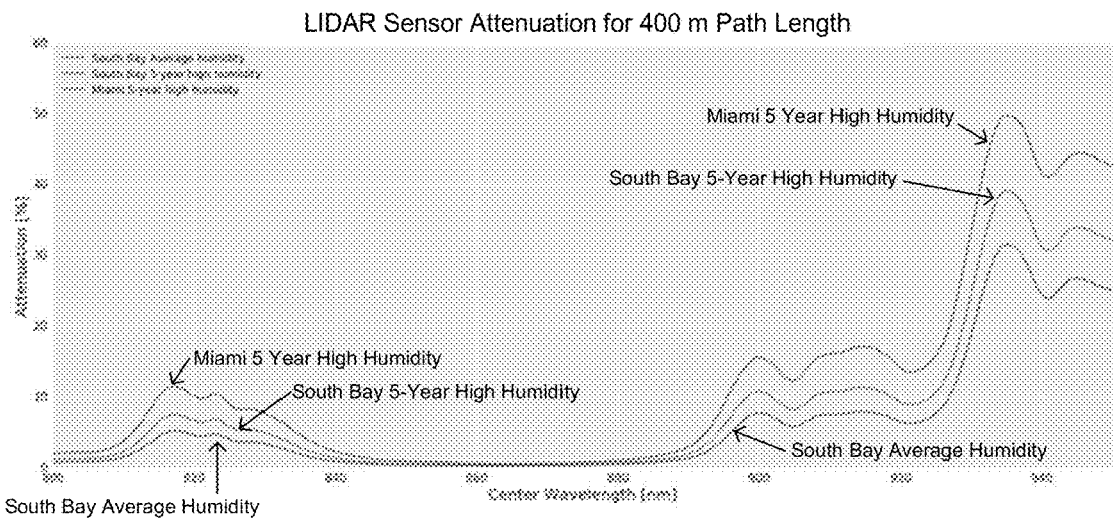
FIGS. 5A-5C are examples of attenuation of sensors caused by humidity in accordance with aspects of the disclosure.
Figure 5B:
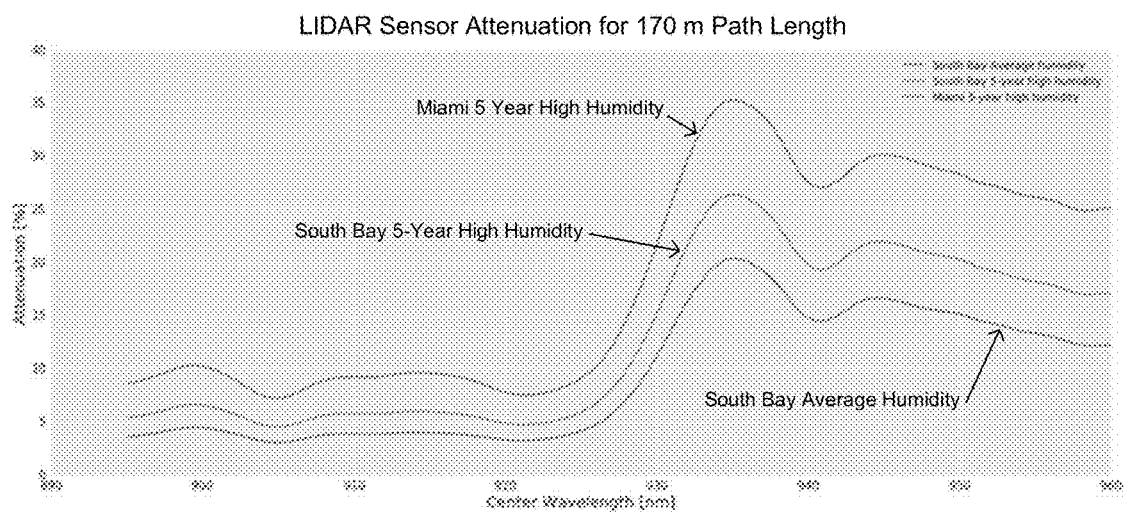
Figure 5C:
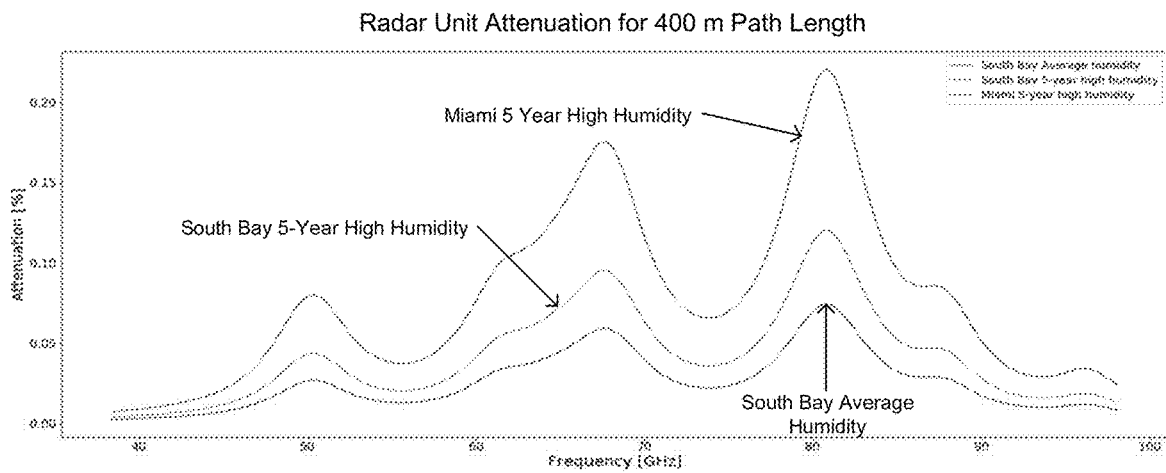

FIGS. 5A-5C provide examples for attenuation of LIDAR sensors and radar units for different levels of humidity. In each of these examples, three levels of humidity are depicted; South Bay Calif. average humidity, South Bay Calif. 5-year high humidity, and Miami Fla. 5-Year high humidity. In this regard, the South Bay, Calif. average humidity is lower than the South Bay, Calif. 5-year high humidity, which is lower than the Miami, Fla. 5-Year high humidity. It will be appreciated that Miami is among the most humid of environments in the United States among major cities, and hence is used here as a benchmark as most other big cities, if not all, will have less humidity.

FIG. 5A is an example of attenuation of a LIDAR sensor which may be arranged in a roof-top housing of a vehicle such as dome housing 312. In this example, light from the LIDAR sensor may have approximately a 400 meter path length. As can be seen, attenuation levels are generally greater for greater levels of humidity below 840 nanometers and above 880 nanometers, but increase dramatically above 1020 nanometers.

FIG. 5B is an example of attenuation of a LIDAR sensor which may be arranged in lateral housing of a vehicle such as housing 230 or housing 232. In this example, light from the LIDAR sensor may have approximately a 170 meter path length. As can be seen, attenuation levels are generally greater for greater levels of humidity, but increase dramatically between 920 and 940 nanometers.

FIG. 5C is an example of attenuation of a radar unit which may be arranged in forward or front end housing of a vehicle such as housing 220. In this example, waves from the radar unit may have approximately a 170 meter path length. As the humidity increases, the attenuation of frequencies between 65 and 70 GHz also increases.

Figure 5D:
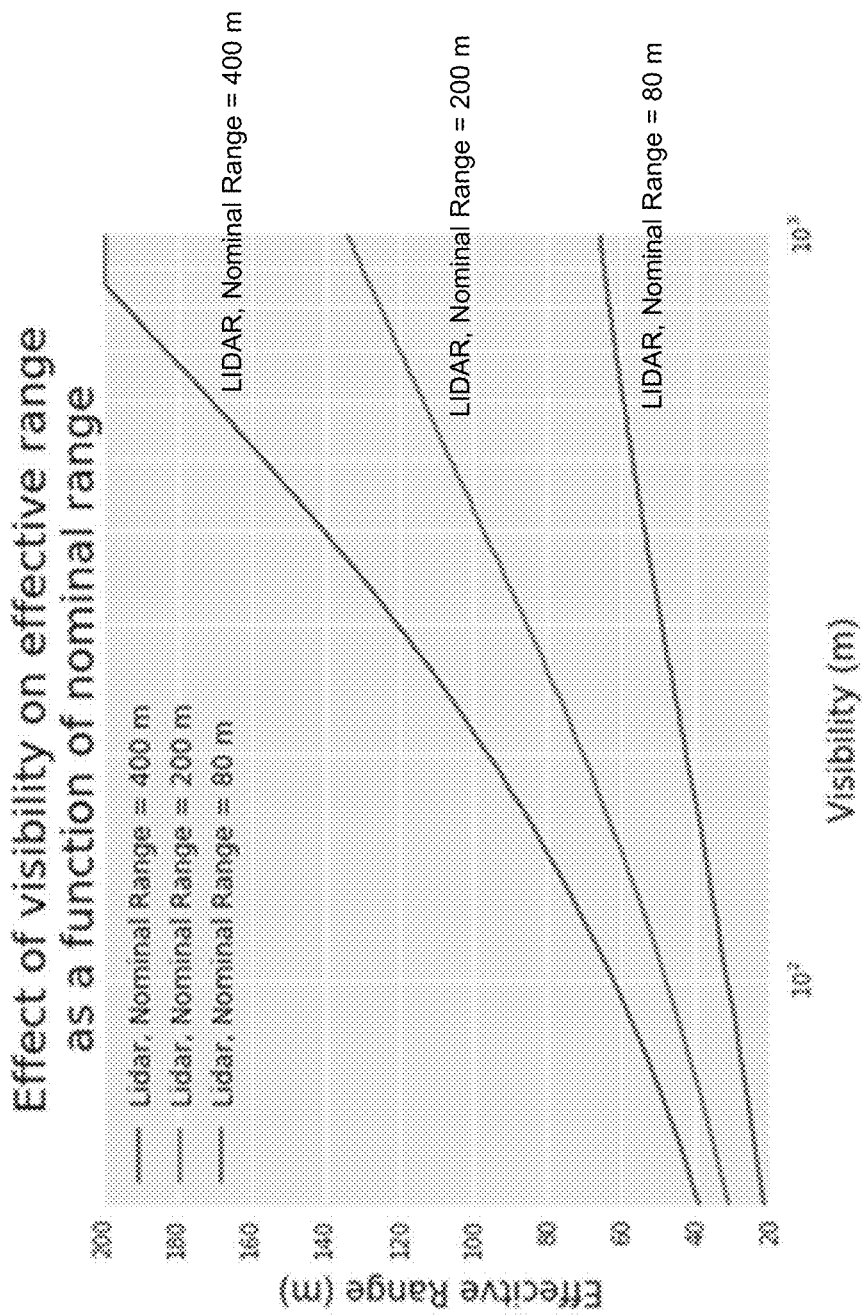
FIG. 5D is an example of the effect of fog on the effective range of different types of LIDAR sensors in accordance with aspects of the disclosure.

FIG. 5D is an example of the effect of fog on the effective range of different types of LIDAR sensors. In this example, 3 different LIDAR sensors are depicted, one with a nominal range of 400 meters, one with a nominal range of 200 meters, and another with a nominal range of 80 meters. In this example, the nominal range may refer to the distance at which the LIDAR sensor would detect a Lambertian target that reflects 5% of its light in clear (non-foggy) conditions. In this regard, as fog increases, the visibility decreases, and so does the effective range of each of the LIDAR sensors. Thus, FIG. 5D plot indicates where LIDAR sensor data points may start to become lost; instead of starting to lose LIDAR sensor data points beyond the nominal range, some LIDAR data points them sooner. Similar effects may be expected for smoke, haze, air pollution or smog since the density of such conditions is often described in terms of visibility.

Figure 6:
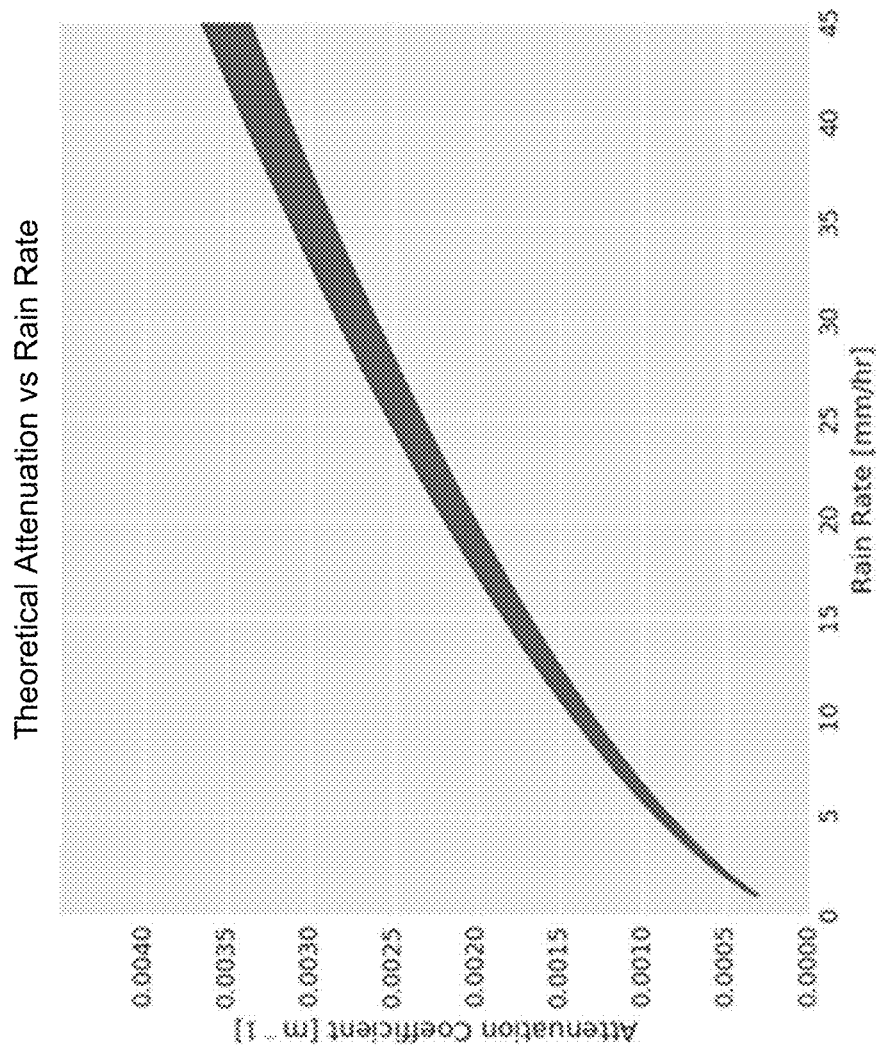
FIG. 6 provides an example of theoretical attenuation of a LIDAR sensor for different rates of rainfall in accordance with aspects of the disclosure.

FIG. 6 provides an example of theoretical attenuation of a LIDAR sensor for different rates of rainfall. This LIDAR sensor may be arranged in lateral housing of a vehicle such as housing 230 or housing 232. In this example, light from the LIDAR sensor may have approximately a 170 meter path length. The plot was generated using a physics-based estimation, but demonstrates how as rain rate increases, the attenuation also increases.

In addition, in some instances, attenuation caused by water or foreign objects and/or debris (FOD) on a sensor aperture may also be modeled by the server computing devices 410. For instance, as drops of water contact an aperture of a sensor, the drops may form curved dielectric elements that act as lenses, in a manner that is detrimental for operation. Depending upon the LIDAR sensors characteristics, photons impinging on the drops may be less likely to make it back to the correct detector. To model aperture occlusion, drops may be modelled to fall on each of our sensor's apertures, based on rain rate, time exposed to rain (e.g. time before wiper wipe), aperture size and orientation, speed of the vehicle (or sensor), contact angle or aperture hydrophobicity, and splash factor or the amount of extra drop coverage than expected due to impact with the aperture lens. Other factors, such as drops coalescing, overlapping and sliding down an aperture may be modeled as well. In any event, regardless of overall aperture area, any aperture with all of the other parameters fixed will have the same average coverage per second.

Figure 7:
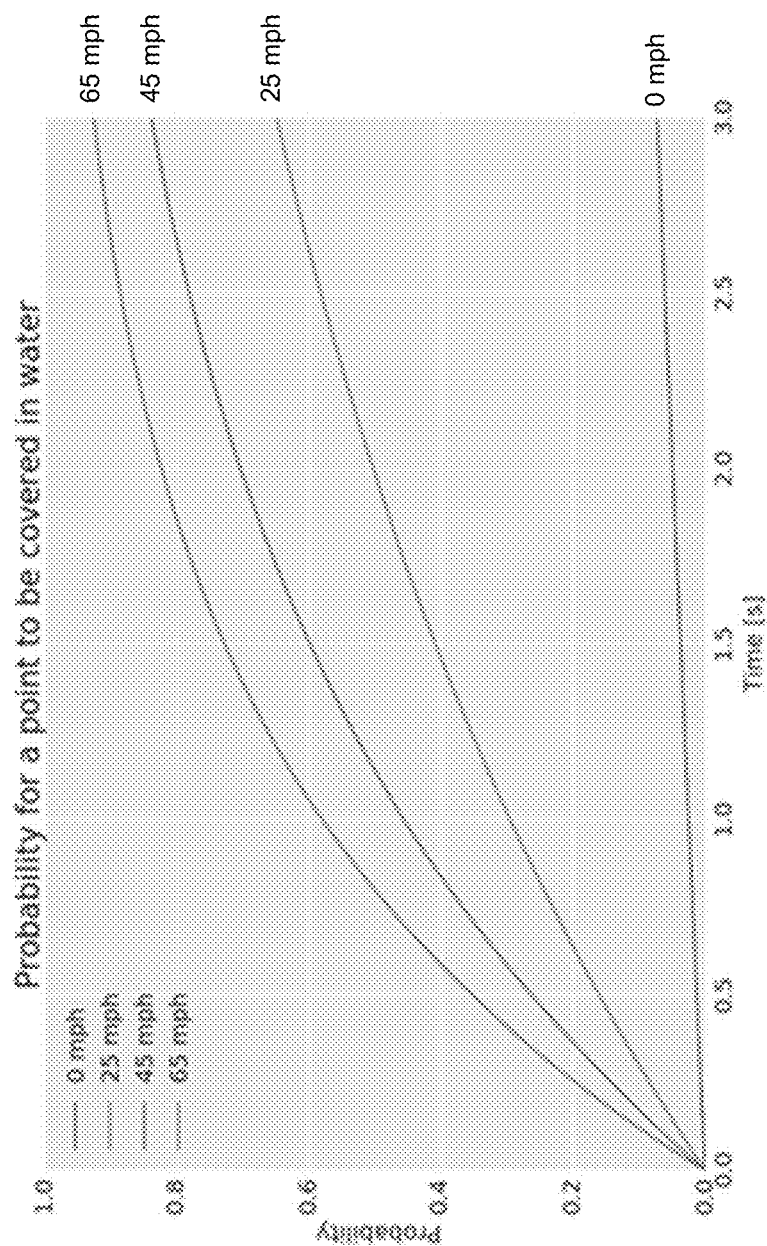
FIG. 7 represents the probability for a point on an aperture of a sensor to be covered in water in accordance with aspects of the disclosure.

FIG. 7 represents the probability for a point on an aperture of a sensor to be covered in water in heavy rain of 44 millimeters per hour with a wiper pass over the aperture of twice per second. In this example, the aperture, or rather the vehicle to which the sensor having the aperture is mounted, is depicted as traveling at different speeds: 0 miles per hour, 25 miles per hour, 45 miles per hour, and 65 miles per hour. As the speed of the vehicle increases, the probability of a point on the aperture to be covered in water also increases.

Figures 8A, 8B:
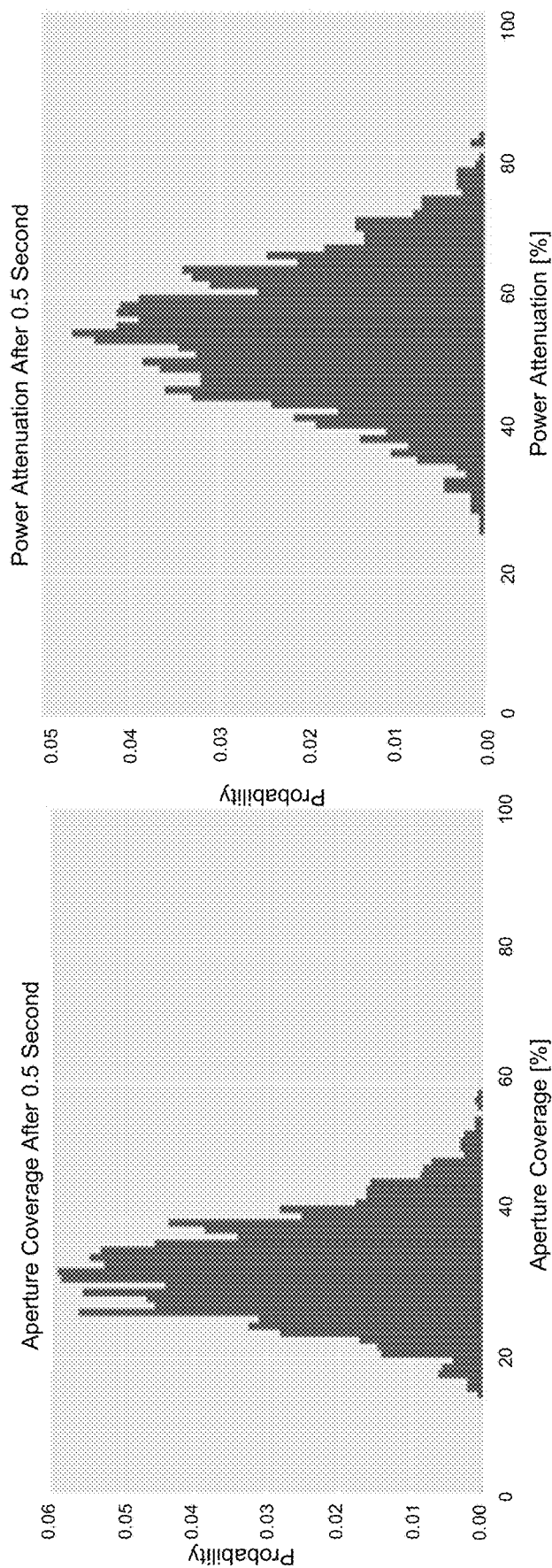
FIGS. 8A and 8B provide an example of the probability of aperture coverage and power attenuation corresponding to the example of FIG. 7 in accordance with aspects of the disclosure.

In addition to attenuation, the power returned through the aperture may also be modelled by the server computing devices 410 as the square of the fractional unoccluded area or rather, the area without any rain or water droplets. FIGS. 8A and 8B provide an example of the probability of aperture coverage and power attenuation corresponding to the example of FIG. 7. As shown, the attenuation, and also the decreased range of the sensor as discussed below, may be proportional to the area covered by rain. In other words, the more rain, the greater the decrease in range.

The attenuation and power return can be used by the server computing devices 410 to determine the effective range of these sensors in such conditions. For example, the expected maximum perception range of these sensors at any given wavelength can be approximated as the square root of the attenuation for different weather conditions. Under normal or nominal circumstances, an equation is used to dictate range at which an object is detected. For a LIDAR sensor, the equation may take into account the initial power, the reflectivity of the object, and the distance to the object to determine how much power should be received back at the LIDAR sensor. However, weather will attenuate light along the distance that the light propagates, and it will do so (on average) as Beer's law dictates, with an exponential attenuation. The following equations combine Beer's Law and the Lidar equation like this, to form something closer to what has historically been known as Allard's Law.

Using a simple model for demonstration purposes, power may be assumed to be scattered as per a Lambertian bidirectional reflectance distribution function (BRDF), and as such, any viewing angle of the target will have equal brightness on the sensor. In other words, a LIDAR sensor positioned a particular distance away will register the same intensity regardless of its azimuth and pitch. The sensed power will decay as an inverse-square law:

$$P = \frac{CP_0}{r^2},$$

In this example, C is a constant which represents a typical or benchmark fraction of returned power at a 1 meter target range for a particular sensor, P_0 is the power of the initial laser pulse, and r is the distance between the target and sensor. Thus, the smallest sensing power may be given by:

$$P_{min} = \frac{CP_0}{x_{max}^2};$$

Rearranging this equation, the expected maximum perception range is given by:

$$x_{max} = \sqrt{CP_0/P_{min}}.$$

Assuming a total attenuation $0 \leq A \leq 1$ has the same effect as an initial pulse having power $AP_0$, the expected maximum perception range may be given by:

$$x_{max} = \sqrt{CAP_0/P_{min}}$$

Thus, $$x_{max} \sim \sqrt{\text{Attenuation}}.$$

A similar equation may be used for radar except that such an equation should be quartic in range rather than quadratic:

$$P_{min} = \frac{CP_0}{x_{max}^4}.$$

Rearranging this equation, the expected maximum perception range is given by:

$$x_{max}^4 = \sqrt{CP_0/P_{min}}.$$

Assuming a total attenuation $0 \leq A \leq 1$ has the same effect as an initial pulse having power $AP_0$, the expected maximum perception range may be given by:

$$x_{max} = \sqrt[4]{CAP_0/P_{min}}$$

Thus, for a radar unit, $$x_{max} \sim \sqrt[4]{\text{Attenuation}}.$$

In other words, by knowing the distance to objects in the labeled sensor data as well as how far the LIDAR sensors, cameras and radar units should be able to detect objects in weather conditions, an attenuation model may be used by the server computing devices 410 to approximate how different weather and operating conditions would affect the sensor data (e.g. LIDAR sensor points, camera images, and radar sensor data points).

Backscatter may refer to the effect of fog redirecting light back to a sensor. For example, with a LIDAR sensor, that light may cause the sensor to infer that an object is in the scene, and thus create many LIDAR data points that may be difficult to distinguish from other more important LIDAR data points in the scene such as those corresponding to real objects like vehicles, pedestrians, etc. Furthermore, some LIDAR sensors may have a limited amount of information that can be recorded in each frame (e.g. 1 rotation of the LIDAR sensor). As such, with enough fog, these LIDAR sensors may become overwhelmed with the light returning to it, causing the LIDAR sensor to become unreliable or even stop sensing beyond a certain distance.

To determine how much backscatter to expect from a LIDAR sensor in fog, a few assumptions may be made. For example, as a pulse of light propagates, it will backscatter light every step of the way, as fog may be considered a continuous medium. In addition, the beams of the LIDAR sensor may have a finite pulse width in the time domain, and as such, each portion of a beam may backscatter light as it propagates through fog.

The following model is used for demonstration purposes but utilizes each of the above assumptions and can be used by the server computing devices 410 to determine the effect of backscatter in fog conditions. In this example, a LIDAR sensor may emits a pulse with an intensity given by:

$$I_{emitted}(t)$$

In this regard, the intensity is a function of time t. When the pulse hits a target of reflectivity R at distance d from the sensor, the intensity of the returned light may be given by:

$$I_{returned}(t) = C \frac{R}{d^2} I_{emitted}(t - 2d/c)$$

Here C is a constant (that can be estimated a priori using calibration targets of known reflectivity at known distances) and c is the speed of light. This can be expanded to many targets by:

$$I_{returned}(t) = \sum_{i=0}^{N} C \int \prod_{j<i} T_j^2 I_{emitted}(t') \delta(t' - t + 2d_i/c) \frac{R_i}{d_i^2} dt' =$$

$$C \sum_{i=0}^{N} \left( \prod_{j<i} T_j^2 \right) \int I_{emitted}(t') \delta(t' - t + 2d_i/c) \frac{R_i}{d_i^2} dt' =$$

$$C \sum_{i=0}^{N} \left( \prod_{j<i} T_j^2 \right) I_{emitted}(t - 2d_i/c) \frac{R_i}{d_i^2}$$

Here, T corresponds to the transmission of each target. Transmission may be a unitless number describing the fraction of light that passes through a target. For example, for glass T might be a high number (~92%), and for a thick wall T may be 0%.

For every "x" distance that the pulse travels, the intensity returned from backscatter may be given by:

$$I_{returned}(t) = \frac{6C}{v\xi} \int \frac{e^{-6x/v}}{x^2} I_{emitted}(t - 2x/c)$$

Here, $\zeta$ may be considered a "lidar ratio" which describes the amount of light that would be backscattered as a fraction of the total amount of light that is scattered or absorbed and would be dependent upon the density of fog. For example, for various types of fog, the lidar ratio may range between 0.1 and 100 or more or less. The value v corresponds to the visibility or Meterological Optical Range.

Figure 9:
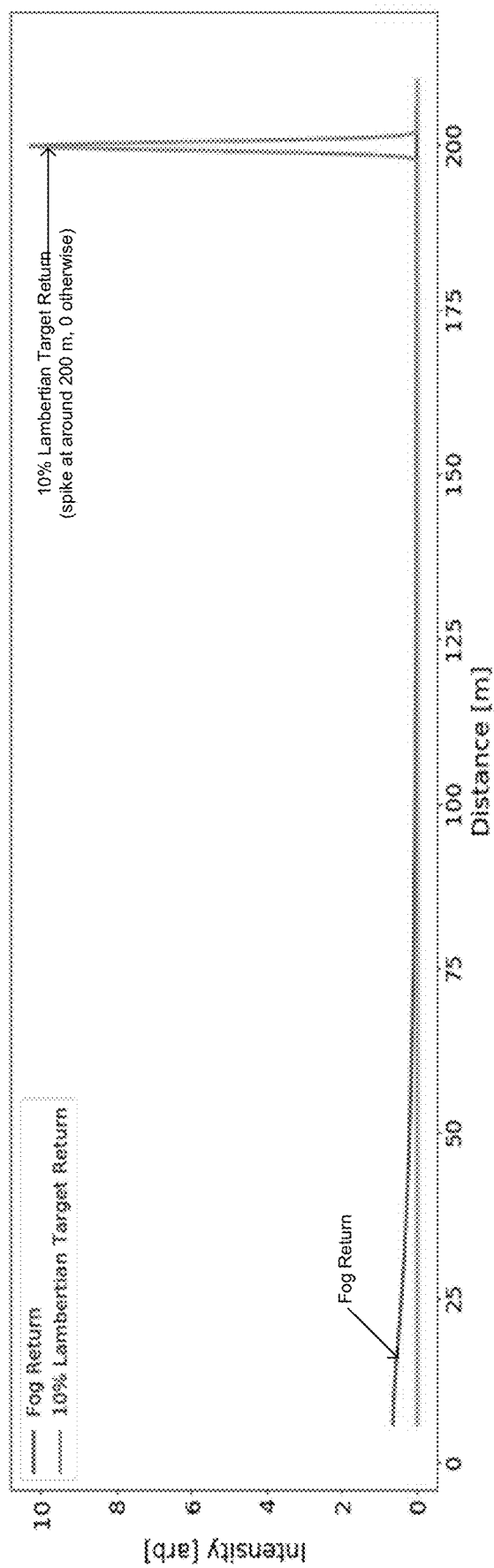
FIG. 9 provides an example of backscatter for a LIDAR sensor in fog in accordance with aspects of the disclosure.

FIG. 9 provides an example plot of the effects of backscatter for a LIDAR sensor in fog conditions depicting distance in meters and arbitrary values for intensity which increase with the y-axis of the plot. In this example, the LIDAR sensor used a pulse width of approximately 10 ns, a visibility of 1 km, and a LIDAR ratio of 20. In addition, a Lambertian target that reflects 10% of its light in clear (non-foggy) conditions was located at 200 meters from the LIDAR sensor. In other words, by knowing the distance to objects in the labeled sensor data as well as visibility and the LIDAR ratio, a backscatter model may be used by the server computing devices 410 to approximate how different weather and operating conditions would affect the sensor data.

In this regard, the labeled sensor data from good weather and/or properly operating sensors may be considered the ground truth for a scene which identifies the range and reflectivity for LIDAR, color for camera, and radar cross section for radar from the perspective of the vehicle when the sensor data was captured. Given this labeled sensor data, new degraded sensor data can be simulated by the server computing devices 410 using the physics-based forward model(s) and setting variables of the model(s) to the desired conditions to be simulated such as rain or snow at various millimeters per hour, fog at various visibilities, focal plane shift at various positions for LIDAR and camera sensors, etc. These forward models may provide a probability of the state of the sensor data given the aforementioned desired conditions.

The result of the aforementioned application of the model or models may be simulated degraded sensor data. For example, the server computing devices 410 may use a filter to remove LIDAR data points beyond the expected range of perception of the LIDAR sensor for the weather condition and may also use a similar filter to remove radar sensor data points beyond the expected range of perception of the radar unit for the weather condition. The server computing devices 410 may also blur or reduce contrast in images to a degree based on the range to each pixel of the camera image for the weather condition. In other words, blurring and reducing contrast may be applied to individual pixels including those that may appear beyond an expected range of perception for the particular condition of the sensor which captured the sensor data.

In addition, in conditions such as fog, smoke, haze, air pollution or smog, low light conditions (i.e. pre-dawn, dusk or night time), or conditions when the mechanical alignment of one or more sensing elements is degraded through, for example, design or reliability issues, less light may be expected to return to the LIDAR, radar, or be received by the camera, as such, dim objects may be difficult to observe. As such, LIDAR and/or radar data points (including intensity values and location information) for dim objects may be removed by the server computing devices 410 if below a predetermined minimum detection threshold, resulting in certain points in the labeled sensor data being lost.

In addition, in rainy conditions, the amount of light lost may be simulated based on the severity of rain by reducing brightness or darkening intensity values of LIDAR and/or radar data points. This may be applied by the server computing devices 410 to filter some data points as well as to modify the intensity of other data points. Radar doppler signals may also be impacted by rain, blowing snow, or other dynamic atmospheric conditions. Similarly, the server computing derives 410 may darken or reduce the brightness of a camera image, reduce the contrast, increase blur, etc. These approaches may be most useful to approximate the effects of fog and rain on sensor data, but may not be as useful in other weather conditions, such as snow.

In addition, when the mechanical alignment of one or more sensing elements is degraded through design or reliability issues, the spatial resolution of the sensor may be degraded. This may, for example, result in defocus for a camera or crosstalk between channels in a LIDAR sensor or radar unit. This reduced spatial resolution may make objects more difficult to detect. This can be modeled by convolving the sensor data with an appropriate kernel (i.e. "blurring" the data), e.g. a tophat kernel to simulate defocus or a gaussian kernel to simulate motion blur.

In addition, when one or more sensors is pointing towards the sun (typically when the sun is at a low angle relative to the horizon) or another bright light (e.g. the headlights of an oncoming car), this may introduce some degradation in sensing performance that may make objects more difficult to detect. In particular, this may introduce stray light artifacts (including structured artifacts such as lens flare or ghost images or the sun, veiling glare or "haze", and so on) in camera and/or lidar and range degradation in lidar (from the elevated "background" photon level from the sun). These effects can be modeled by characterizing the response of the sensor (either camera or lidar) to a bright source (for example, the sun in a field setting or a synthetic source in a lab setting) to extract the degradation produced on the sensor as a function of source position and brightness. Alternatively, these effects can be modeled from first principles using simulation (e.g. ray tracing and/or electromagnetic) of the sensor response. Such models can then be applied to any sensor data to simulate the additional effect of having the sun or another bright source present at that angle in the sky.

As a simple example, the sun subtends an angle of about 0.5 degrees. A "perfect" or ideal camera system with no stray light artifacts will produce an image on the sensor that is closely approximated by a white disk with this angular extent. In reality, typical camera systems in use today will introduce additional stray light. This disc can be added at any position to any camera image to simulate the sun being present in that position. However, in reality, the image of the sun will be more complex and depend nontrivially on the position of the sun in the camera image. That this approach can also be used to model degradations to multiple sensors simultaneously, e.g. blinding of both camera and LIDAR sensors by the sun at the same time.

The degradation effects described above (stray light or "blinding" effects) may also be influenced by the condition of the sensor aperture, e.g. the presence of water, dirt, organic matter (e.g. insect corpses, avian excrement, etc.) or other contaminants, or scratches/digs or other mechanical damage to/disruption of the aperture. These effects can also be extracted from a combination of field and laboratory testing and then likewise applied to any sensor data to simulate the effect of this combination of degradations.

It will be appreciated that even when generating degraded camera images, LIDAR sensor data can be used by the server computing devices 410 to determine the range to each pixel in the camera image in order to enable the determination of the desired amount of loss of contrast, backscattering, etc.

In addition, such degradation can also be applied by the server computing devices 410 to sensor data captured using an MTF target, which may enable a mapping of the structured test measurable quantity (MTF) to performance of the perception system. This may provide quality metrics necessary to assemble the sensors to meet the overall object detection and classification requirements for the perception system. For example, if there is a real or simulated camera image of an MTF target in 10 millimeter per hour rain where the MTF is measured to be 90% at 200 m and there is labeled real or simulated camera images of scenes in 10 millimeter per hour rain, and the perception system 172 is able to detect vehicles at 200 m with 80% precision and 70% recall in those scenes, this may lead to an inference that at 200 m, an MTF of 90% corresponds to 80% precision and 70% recall. This inference may then be aggregated over various ranges, weather severities, and weather conditions, to arrive at a more general equation for precision and recall given particular MTF values. This relationship between sharpness, MTF and detectability in different conditions can be evaluated and used to generate minimum hardware performance requirements as well as to determine when it is appropriate and not appropriate to have the vehicles drive in the autonomous driving mode. In other words, this may be used to determine when weather conditions are "too bad" to drive autonomously.

As another approach, a machine learned model may be trained by the server computing devices 410 to apply textures and low-level image operators that degrade image quality in weather. These can be applied as a delta to the labeled sensor data to generate the simulated degraded sensor data. This operation may be implemented as a neural style transfer, where the image is adjusted to maximize the activations of deep net neurons corresponding to these texture layers or as a style transfer GAN (generative adversarial network) in which a generator network applies the image operators to degrade the image while a discriminator network classifies if the image is real or artificially degraded. In addition to the sensor data, an input could be a "weather severity" vector (X millimeters per hour rain and/or Y meters visibility fog, etc.) that we can measure as ground truth in the sensor data, but in the simulated weather-degraded sensor data may act as a control input to generate weather effects of various severities on the input sensor data. Because only weather-degraded sensor data is needed to train the model, the training can be unsupervised.

As another approach, pairs of sensor data for the same scene in different conditions (e.g. good weather and bad weather) may be used by the server computing devices 410 to train an auto-encoder type neural net in order to produce simulated degraded sensor data given other sensor data as input. As with the example above, in addition to the sensor data, an input could be a "weather severity" vector (X millimeters per hour rain and/or Y meters visibility fog, etc.) that we can measure as ground truth in the sensor data, but in the simulated degraded sensor data may act as a control input to generate weather effects of various severities on the input sensor data.

It will be appreciated that the examples in the preceding paragraphs are focused on weather, but the features described herein can be applied to the other degradations discussed above. For example, the approaches described herein may be used to apply degradations from non-weather aperture fouling, stray light effects, or sensor design or performance issues (e.g. sensor noise, misalignment of optical or electronic elements, and so on). Likewise, the approaches described herein could be used to simulate sensor data arising from non-weather environmental conditions, for example, simulating sensor data at night (or an arbitrary time of day/sun angle) based on input data from the day.

Returning to block 1030 of FIG. 10, the simulated degraded sensor data may be used to evaluate or train a model for detecting objects of the perception system. As noted above, the simulated degraded sensor data may then be used by the server computing devices 410 to evaluate and improve the performance of the perception system. For instance, the simulated degraded sensor data (without labels) may be input into the various models of the perception system, and the resulting perceived objects can be compared to the labels from the original sensor data. In addition, the simulated degraded sensor data and labels from the original sensor data may also be used to further train the models and improve perception of objects, including the detection, classification, determination of characteristics such as size, contour, position, velocity, heading, and other attributes in various weather conditions.

The features described herein may provide for a cost effective and efficient way to provide degraded sensor data in any number of different conditions. In addition, by simulating the data, this may save not only time, but also wear and tear on vehicles as well as prevent human operators from being put into dangerous situations unnecessarily. Moreover, by simulating degraded sensor data, the performance of the perception system in different conditions can be evaluated, but also improved by using the simulated degraded sensor data to train the models of the perception system.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as

The invention claimed is:

1. A method for generating simulated degraded sensor data, the method comprising:
    receiving, by one or more processors, first sensor data collected by a sensor of a perception system of an autonomous vehicle;
    converting, by the one or more processors, the first sensor data into simulated degraded sensor data for a particular degrading weather-related condition; and
    using, by the one or more processors, the simulated degraded sensor data to train a model for evaluating performance of the perception system to detect objects external to the autonomous vehicle under one or more degrading weather-related conditions.

2. The method of claim 1, wherein converting the first sensor data includes using a physics-based forward model to approximate attenuation caused by the particular degrading weather-related condition.

3. The method of claim 2, further comprising determining an expected maximum perception range for the sensor which captured the first sensor data based on the approximated attenuation, and wherein converting the first sensor data into simulated sensor data for the particular degrading weather-related condition is further based on the expected maximum perception range.

4. The method of claim 1, wherein the particular degrading weather-related condition is fog, and the simulated degraded sensor data simulates a backscatter effect of fog redirecting light back to the sensor.

5. The method of claim 1, wherein the particular degrading weather-related condition is humidity, and the simulated degraded sensor data simulates attenuation effects at different wavelengths of light.

6. The method of claim 1, wherein the particular degrading weather-related condition is rain, and the simulated degraded sensor data simulates attenuation effects of rain of a particular severity.

7. The method of claim 1, wherein the particular degrading weather-related condition is drops of water on an aperture of the sensor, and the simulated degraded sensor data simulates attenuation effects of the drops of water.

8. The method of claim 1, further comprising:
    determining an expected maximum perception range for the sensor based on the approximated attenuation.

9. The method of claim 1, wherein converting the first sensor data includes filtering the first sensor data to remove one or more of LIDAR sensor data points or radar sensor data points beyond an expected range of perception for the particular degrading weather-related condition.

10. The method of claim 1, wherein converting the first sensor data includes blurring and reducing contrast in images of the first sensor data to a different degree depending on a range of each pixel for the particular degrading weather-related condition.

11. The method of claim 1, wherein converting the first sensor data includes filtering the first sensor data to remove one or more of LIDAR sensor data points or radar sensor data points corresponding to objects having intensity values below a predetermined threshold for the particular degrading weather-related condition.

12. The method of claim 1, wherein converting the first sensor data includes darkening all or portions of a camera image based on the particular degrading weather-related condition.

13. The method of claim 1, wherein converting the first sensor data includes darkening one or more intensity values of one or more of LIDAR sensor data points or radar sensor data points based on the particular degrading weather-related condition.

14. The method of claim 1, wherein the model is a machine learned model trained to produce the simulated degraded sensor data when the first sensor data is input into the machine learned model.

15. The method of claim 14, wherein the machine learned model trained to apply textures and low-level image operators that degrade image quality in the particular degrading weather-related condition.

16. The method of claim 14, further comprising, training the machine learned model using an unsupervised learning approach where degraded sensor data is used rather than a combination of nominal sensor data and degraded sensor data.

17. The method of claim 16, further comprising, training the model using pairs of sensor data for a same scene in different weather-related conditions.

18. The method of claim 1, wherein evaluating the model includes:
    inputting the simulated degraded sensor data into the model to identify one or more labels for objects; and
    comparing the identified one or more labels for objects with one or more labels associated with the first sensor data.

19. The method of claim 1, wherein training the model includes using the simulated degraded sensor data and one or more labels for objects associated with the first sensor data as training data for the model in order to improve performance of the model for the particular degrading weather-related condition.

20. A method for generating simulated degraded sensor data, the method comprising:
    receiving, by one or more processors, first sensor data collected by a sensor of a perception system of an autonomous vehicle;
    converting, by the one or more processors, the first sensor data into simulated degraded sensor data for a particular degrading condition; and
    using, by the one or more processors, the simulated degraded sensor data to train a model for evaluating performance of the perception system to detect objects external to the autonomous vehicle under one or more degrading conditions.

21. The method of claim 20, wherein the degrading conditions are associated with one or more of fog, smoke, haze, air pollution or smog, lighting or sensor mechanical alignment conditions.

* * * * *

UNITED STATES PATENT AND TRADEMARK OFFICE
CERTIFICATE OF CORRECTION

| | |
|---|---|
| PATENT NO. | : 11,514,343 B2 |
| APPLICATION NO. | : 16/916384 |
| DATED | : November 29, 2022 |
| INVENTOR(S) | : Nicholas Armstrong-Crews et al. |

It is certified that error appears in the above-identified patent and that said Letters Patent is hereby corrected as shown below:

In the Claims

Claim 8
Column 19, Line 48:
Now reads "The method of claim 1,"; should read -- The method of claim 2, --

Signed and Sealed this
Fourteenth Day of February, 2023

Katherine Kelly Vidal
*Director of the United States Patent and Trademark Office*